July 6, 1948. M. LUTJEN 2,444,742
GAS TURBINE
Filed May 22, 1945 4 Sheets-Sheet 1
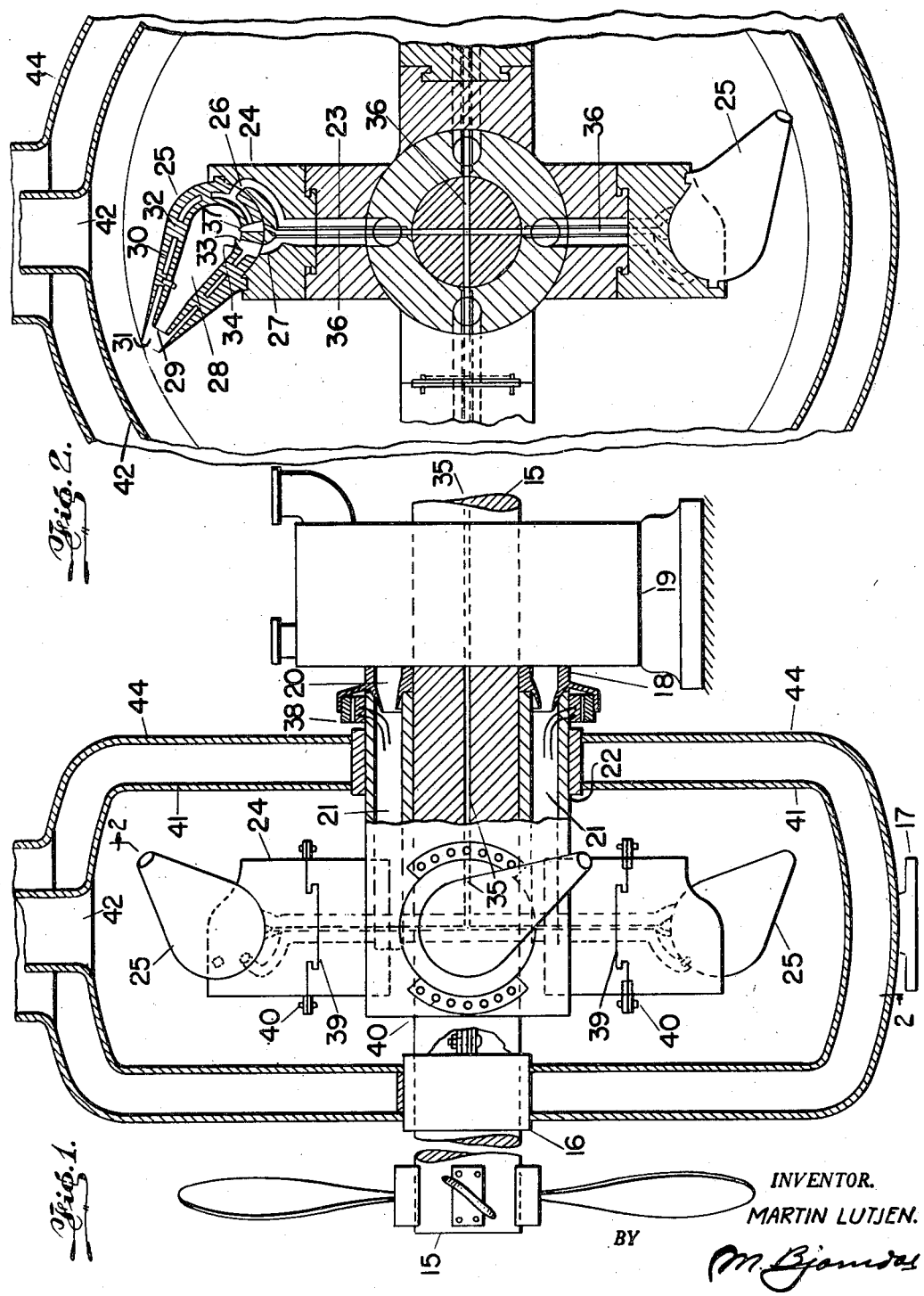
INVENTOR.
MARTIN LUTJEN.
BY
ATTORNEY.

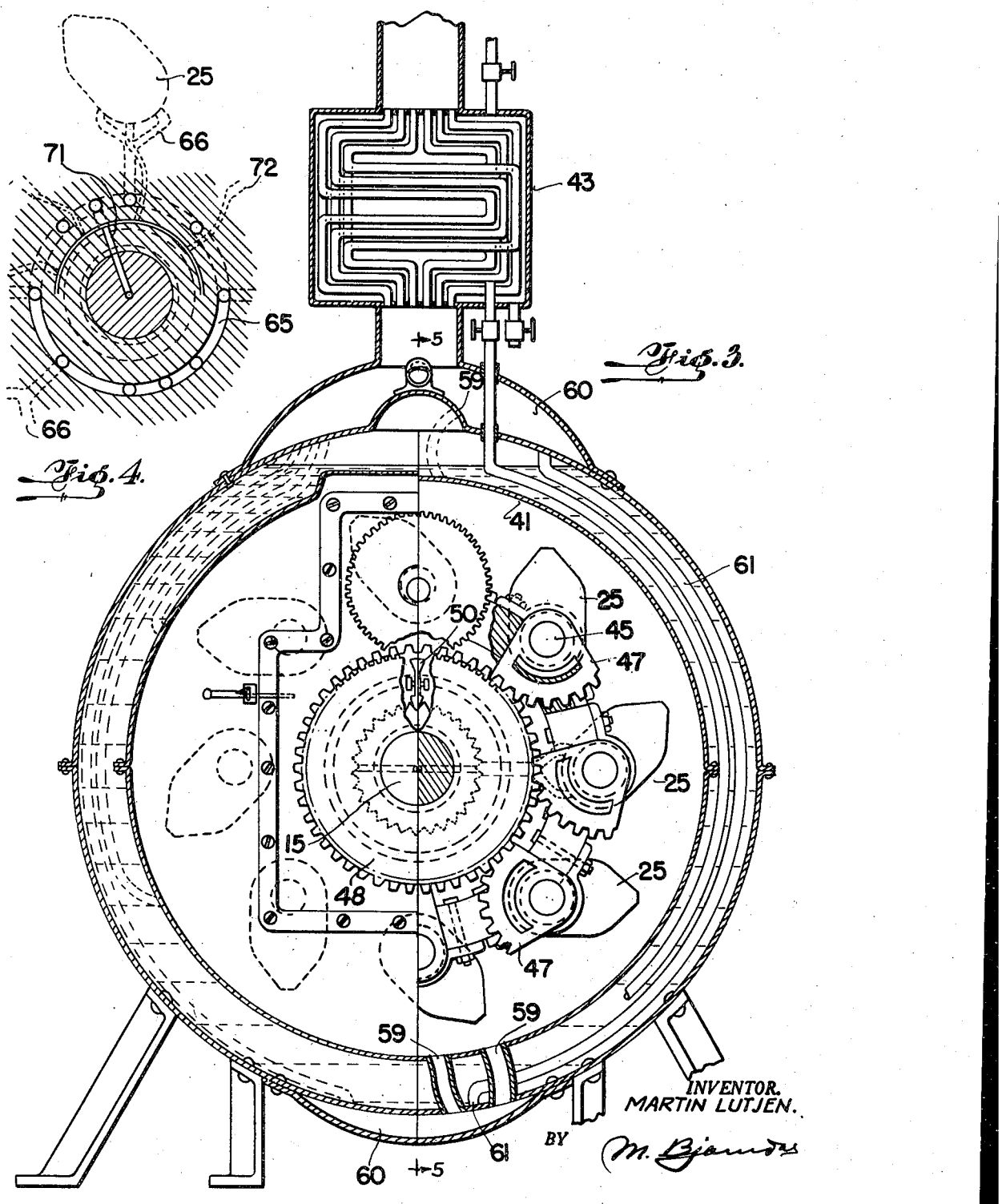

July 6, 1948.　　　　　　　　M. LUTJEN　　　　　　　2,444,742
GAS TURBINE
Filed May 22, 1945　　　　　　　　　　　　　　4 Sheets-Sheet 3
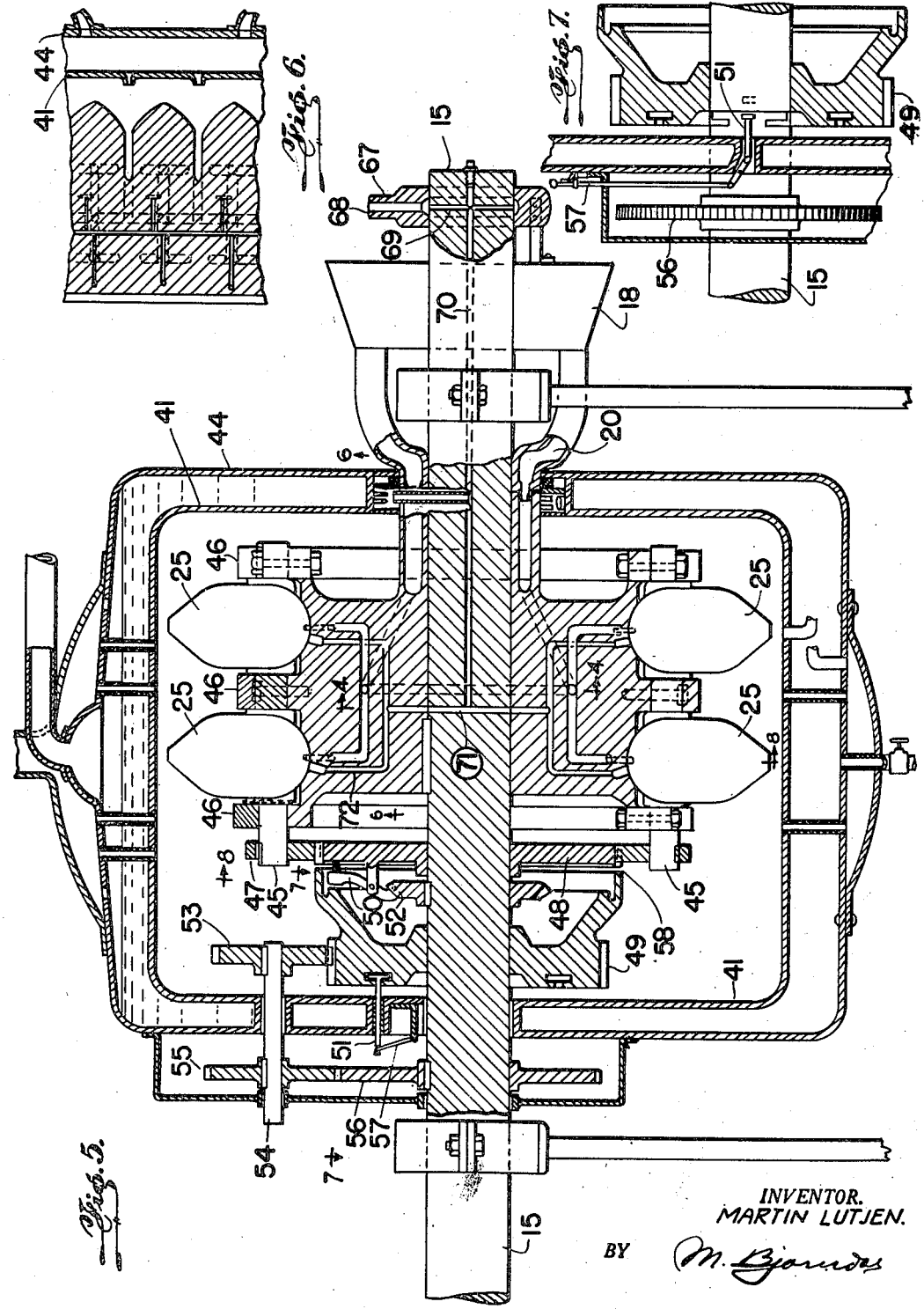
INVENTOR.
MARTIN LUTJEN.
BY
ATTORNEY.

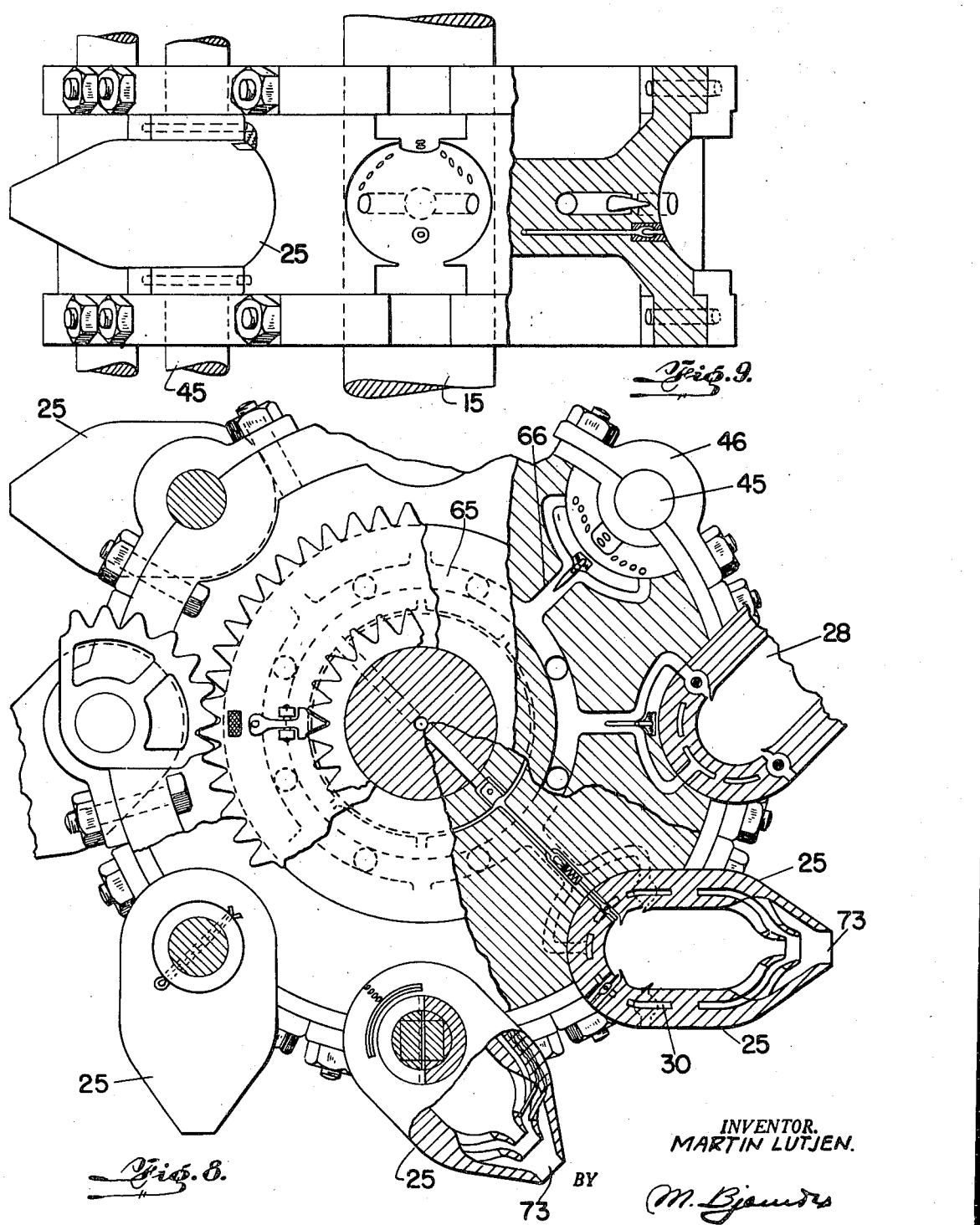

Patented July 6, 1948

2,444,742

UNITED STATES PATENT OFFICE 2,444,742

GAS TURBINE

Martin Lutjen, Hoboken, N. J.

Application May 22, 1945, Serial No. 595,165

7 Claims. (Cl. 60—41)

This invention relates to new and useful improvements in gas turbines, and more specifically it has for its purpose to provide a reversible gas turbine, so constructed as to prevent overheating while at the same time maintaining a comparatively high efficiency.

Thus, it is an object of my invention to prevent the combustion gases from heating up the entire body of the turbine; instead of the said gases are in my invention directed or thrown outward from the aircooled combustion chambers.

A water-cooled casing forms part of my said construction and is in effect a boiler which generates steam from the heat of the combustion gases, which later may be used for a number of purposes.

Thus an auxiliary set of turbine blades may be driven by the steam from said casing, whereby a portion of the heat energy dissipated by the combustion chambers would be utilized.

Furthermore, in case the said gas turbine would have to be stopped for the purpose of reversing, or otherwise, for a short period of time, the steam generated in said casing could then be used for re-starting the turbine, and thus make any frequent starting and stopping less troublesome than is the case with most of the now commonly used combustion gas turbines.

With the above and other objects in view, this invention consists of the novel features of construction, combination and arrangement of parts hereinafter fully described, claimed and illustrated in the accompanying drawings, forming part of this specification, and in which similar characters of reference indicate corresponding parts in all views, and in which:

Figure 1 is a longitudinal view, partly in section, of a turbine, showing a single row of combustion chambers.

Figure 2 is a cross sectional view, taken on the line 2—2 in Figure 1.

Figure 3 is a cross sectional view of a gas turbine, according to my invention, showing reversing mechanism.

Figure 4 is a cross sectional view, taken on the line 4—4 in Figure 5.

Figure 5 is a sectional view, taken on the line 5—5 in Figure 3.

Figure 6 is a cross sectional view, taken on the line 6—6 in Figure 5.

Figure 7 is a sectional view, taken on the line 7—7 in Figure 5.

Figure 8 is a sectional view, taken on the line 8—8 in Figure 5.

Figure 9 is an end view of Figure 8.

Referring more particularly to the drawings and to Figure 1, the numeral 15 indicates a main shaft mounted in bearings, of which one, 16, is shown; the turbine rests upon a base 17. The air for combustion and for cooling the combustion chambers is supplied to a header 18 under pressure furnished by a compressor 19 of conventional design; said header 18 forms a stationary collar around the rotatable shaft 15, and enters from there through spouts 20 into an annular groove 21 of a collar 12, which, in turn, is rigidly fastened to the shaft 15. The collar 22 fits snugly against the header 18, while its annular groove 21 branches off into separate passages 23 leading to seats 24 of the combustion chamber units 25, one passage for each seat.

Within these seats the said air passages branch off into separate passages 26 and 27, both of which have a separate opening through the top of the seats.

The combustion chamber unit 25 is of a novel design and so constructed that it may be effectively air cooled. Said unit has a firing chamber 28, which tapers into one or several jets, or outlets 29. The combustion takes place in this firing chamber. A cooling jacket 30 surrounds the latter and has outlets or jets 31 adjacent to or surrounding the combustion jets 30. There is, as may be noted, a sufficient number of solid sections 32 between the inner wall and the outer wall, which walls are otherwise separated by the cooling jacket 30, to rigidly support said inner wall.

The cooling jacket 30 has an inlet at 26 through the outer wall of the firing chamber 28, said inlet at 26 joins the air branch 26 of the seat 24, while an opening 33 through the inner wall lines up with the other air branch 27 of the seat 24, whereby the air from the compressor 19 may feed the firing chamber and also pass through the cooling jacket.

In addition to the above there may also be supplementary cooling ducts having an inlet opening through the outside wall of the combustion chamber, so as to gather up air for cooling from the vicinity of the rotating shaft.

The air inlet 33 to the firing chamber has arranged thereat a flap 34, said flap serves to deflect the air and forces it to circulate along the wall of the firing chamber 28, whereby a better mixing of the air with the atomized fuel may be effected.

This arrangement also aids in keeping the wall cool, and the flap, by deflecting the pressure of the combustion gases away from the air inlet 33, allows air to enter the firing chamber more freely.

The fuel to be consumed in the firing chambers 28 is pumped in under high pressure through the opening 35 in the shaft 15. At a point in the shaft located in proper relation to the firing chambers, there are four radial ducts 36 which lead to the inlet nozzles 37 in the firing chambers 28. The fuel is injected at a sufficiently high pressure to atomize same in the usual manner and ignition is accomplished by means of spark plugs which are inserted in the firing chamber from outside in the conventional manner and which are connected by cables leading through the air passages to slip rings 38 which are connected to the ignition system. The spark plugs have been eliminated in the drawing for the sake of simplicity.

The seats 24 holding the combustion chambers 25 are mounted upon dovetails 39. see Figure 1, which are rotatable and adjustable by means of bolts 40 to give the nozzles of the combustion chambers the proper angle. The turbine rotor revolves in an inner housing 41 with the exhaust port 42 through which the combustion gases escape. The combustion gas may be conducted through a heat exchanger 43, see Figure 3, where the water used in the steam boiler is pre-heated by means of waste heat in the combustion gas. This is one way of obtaining a higher efficiency of the turbine. The outer housing 44 forms a boiler which occupies the space between the housing 41 and the housing 44. According to the application for which this turbine is to be used this boiler or cooling chamber may be used in several ways. If it is desired to run the turbine very cool, one may circulate cooling water through this water jacket and remove the heat absorbed on the outside in some suitable heat exchanger. In most cases, however, it will be more satisfactory to run the water jacket as a boiler and let the cooling water evaporate due to the waste heat of the turbine, whereupon, the steam may be used to drive auxiliary units or even to furnish additional prime power by means of a steam turbine added on the same shaft with the gas turbine.

In Figures 3 to 9 inclusive is illustrated a turbine embodying my invention in which the combustion chambers 25 are rotatable upon pivots 45. The pivots 45 extend to both sides from firing chambers 25 and are journalled in bearings 46, see Figure 5. The shaft or pivot 45 carries at one end the gear segment 47 which is in mesh within large gear 48 which is rotatably mounted upon the shaft 15. The gear 48 may be coupled to the gear 52 by means of a coupling 50 which is mechanically operable from outside by means of the plunger 51 as hereinafter described. In this manner the gear 52 may be locked to gear 48 and both may be locked to the shaft 15. When in this position gears 48 and 52 are rotating with the shaft with the same speed as the shaft. The gear 49 is in mesh with the gear 53 which is mounted on shaft 54 with gear 55, see Figure 5. Gear 55 is in mesh with gear 56 which is fastened upon shaft 15.

The gears and levers described above serve to reverse the direction of rotation of the turbine. This is accomplished by means of the plunger 51 which is ordinarily locked in place by the latch 57. The plunger 51 may be operated either by a solenoid or by direct mechanical means. By means of said plunger 51 gear 49 may be pushed along shaft 15 until its face 58 touches the face of gear 48. At this point the motion of gear 49 will have unlocked the lever 50 which permits gear 48 to turn and thereby turning gear 47 and the firing chambers 25. The friction between the face 58 of gear 49 and the face of gear 48 will cause gear 48 to turn slowly until gear 47 has moved the firing chambers 25 into the reverse position which is 90 degrees from the forward position. At this point the firing chambers cannot be turned any more and the gears 47 and 48 can turn no more. The friction between the face of gear 49 and gear 48 will, therefore, cause gear 49 to slip and same is pulled out of engagement with gear 48 whereupon the lever 50 again is released and locks gear 48 to gear 52. The firing chambers are thus again locked into reverse position. This is illustrated in detail in Figures 4, 8, and 9.

In Figures 4, 8, and 9 is particularly illustrated how the compressor 18 is connected through channels 20 which lead to the annular channel 65 which has radial outlet 66 connecting to the combustion chambers 25. This is clearly illustrated in Figures 4, 5, 8, and 9. The fuel intake is through a collar 67 with inlet 68 connecting to a groove 69 in the shaft 15. This groove is connected to a central axial hole 70 which connects to the radial channel 71 which is connected through a plurality of channels 72 to the fuel intake ports of the combustion chambers 25, see particularly Figure 5. The fuel is fed through these channels under pressure by means of an ordinary fuel chamber which is not illustrated in the drawings. The fuel is atomized by the high pressure air and is blown into the combustion chambers in the usual manner. The combustion chambers are supplied with regular spark plugs which ignite the atomized fuel and combustion thus takes place. Due to the high pressure developed by the combustion the exhaust gases will escape through the nozzles 73 of the combustion chambers 25 and a reaction pressure will be developed which will turn the rotor. The combustion chambers 25 are furnished with cooling channels 30 through which air may be blown to cool the chambers and prevent overheating of same.

The operation of my invention has been partially described above but may be summarized as follows:

The main difference in my turbine over the prior art, I believe is in the fact that same is easily regulated and reversible in direction of operation. Furthermore, I have a new and important improvement in the use of the outer casing of my turbine, as a boiler, useful both for the cooling of the turbine and also for the recovery of waste heat energy. In Figure 3 is illustrated how this boiler is operated. The exhaust from the turbine passes through the ports exchanger 43. The heat exchanger 43 is so arranged that waste heat from the exhaust gases is absorbed through pipes carrying the feed water to the boiler. I have also made arrangements for direct heating of the water in the boiler by means of pipes 61 which carry exhaust gases from the header 60 to the heat exchanger 43. A certain amount of heat is, of course, also conducted into wall 41 of the boiler and the water in same may thus be evaporated and the steam may be superheated if desired. This steam is in turn used for auxiliaries and also for prime power purposes as mentioned supra. The reversible features of my turbine have been described supra, and shall not be repeated here.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A gas turbine of the character described comprising a shaft; a rotor mounted on said shaft; a compressor mounted on said shaft; a plurality of combustion chambers removably fastened along the periphery of said rotor, said rotor and shaft having channels connecting said compressor to said combustion chambers, and an outer housing enclosing said rotor and combustion chambers.

2. A gas turbine of the character described comprising a shaft; a rotor mounted on said shaft; a plurality of combustion chambers rotatably mounted on said rotor; a compressor mounted on one end of said shaft, said shaft and said rotor having channels connecting said compressor to said combustion chambers, and an outer housing enclosing said rotor and combustion chambers.

3. A gas turbine of the character described comprising a shaft; a rotor mounted on said shaft; a plurality of combustion chambers rotatably mounted along the periphery of said rotor; a compressor mounted on one end of said shaft, said rotor and shaft having channels connecting said compressor to said combustion chambers and also a separate channel for fuel injection, and an outer housing comprising a cooling jacket, said outer housing completely enclosing said rotor and combustion chambers.

4. A gas turbine of the character described comprising a shaft; a rotor mounted on said shaft; a plurality of rotatable combustion chambers mounted along the periphery of said rotor; a compressor mounted on one end of said shaft, said shaft and said rotor having channels connecting said compressor to said combustion chambers and separate channels permitting fuel injection; manually operated means whereby said combustion chambers may be turned whereby the direction of rotation of the turbine may be reversed, and an outer housing comprising a boiler whereby the waste heat from combustion gases may be recovered.

5. A gas turbine of the character described comprising a shaft; a rotor mounted on said shaft; a plurality of combustion chambers mounted in two rows around the periphery of said rotor, said combustion chambers having pivots journalled in bearings of said rotor; a plurality of gear segments mounted one on each of said pivots; manually operable gearing means engageable with said gear segments whereby the rotation of said gas turbine may be reversed; a compressor mounted on one end of said shaft, said rotor and shaft having channels connecting said compressor to said combustion chambers, and an outer housing comprising a waste heat boiler enclosing said rotor and said combustion chambers.

6. A gas turbine of the character described in claim 5 wherein said manually operated gearing comprises a large gear freely rotatable upon the main shaft of the turbine; a second smaller gear fastened upon said shaft adjacent to said large gear, said large gear having a spring loaded lever engageable wtih said fixed gear; a sliding gear rotatable on said shaft and having a face extending up against said large gear; a set of gears engageable with said sliding gear and journalled in the outer housing of the turbine; a driving gear fastened upon the main shaft of the turbine and being in engagement with said set of gears, and lever means whereby said sliding gear may be pushed axially into engagement with the face of said large gear whereby same may be slightly turned by friction between said face and said gear thereby rotating the combustion chambers and changing the direction of operation of said turbine.

7. A gas turbine of the character described in claim 5 where said outer housing comprises a waste heat boiler, said waste heat boiler having piping means connecting to a heat exchanger where the boiler feed water is subjected to the heat from the exhaust gases.

MARTIN LUTJEN.

REFERENCES CITED

The following references are of record in the file of this patent:

UNITED STATES PATENTS

| Number | Name | Date |
|---|---|---|
| 915,828 | Cameron | Mar. 23, 1909 |
| 999,776 | Gill | Aug. 8, 1911 |
| 1,110,302 | Flateau | Sept. 8, 1914 |
| 1,934,237 | Russell | Nov. 7, 1933 |

FOREIGN PATENTS

| Number | Country | Date |
|---|---|---|
| 368,858 | France | Oct. 20, 1906 |
| 764,005 | France | May 14, 1934 |